R. L. BECK.
DEVICE FOR MIXING FROSTINGS AND CAKES.
APPLICATION FILED MAY 20, 1914.
1,144,749.
Patented June 29, 1915.
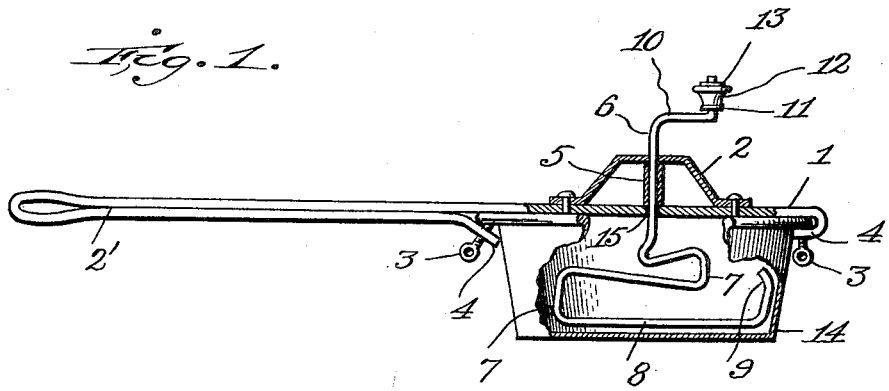
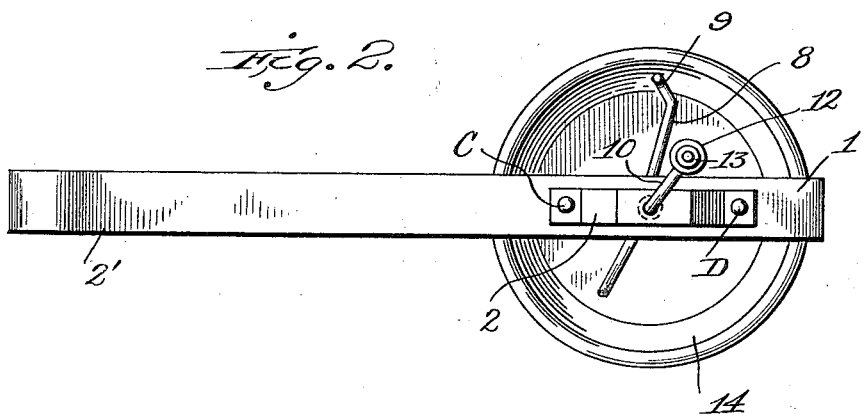
Inventor
Rufus L. Beck
By Morsell, Keeney & French
his Attorneys

UNITED STATES PATENT OFFICE.

RUFUS L. BECK, OF SULLIVAN, WISCONSIN.

DEVICE FOR MIXING FROSTINGS AND CAKES.

1,144,749.   Specification of Letters Patent.   Patented June 29, 1915.

Application filed May 20, 1914. Serial No. 839,790.

*To all whom it may concern:*

Be it known that I, RUFUS L. BECK, a citizen of the United States, residing at Sullivan, in the county of Jefferson and State of Wisconsin, have invented a new and useful Device for Mixing Frostings and Cakes, of which the following is a specification.

The invention relates to mixing attachments.

The invention further designs to provide a mixing attachment which may be readily attached to a suitable sized pan to agitate the contents within the pan or dish.

The invention further designs to provide a mixing attachment consisting of a handle, means for detachably securing said handle to any suitable pan, and an agitator carried by the handle for insertion in the pan to mix the contents within the same.

The invention further designs to provide an agitator attachment consisting of a handle carrying the agitator which handle is provided with means for detachably securing it to a suitable pan whereby the operator may maintain the pan in fixed position by holding the handle with one hand and operating the agitator with the other hand.

The invention further designs to provide a new and improved form of agitator attachment for use on any suitable pan.

The invention consists in the several features hereinafter set forth and more particularly defined by claim at the conclusion hereof.

In the drawings, Figure 1 is a vertical view of the mixing attachment, showing it applied to a pan, parts being shown in section and parts being broken away; Fig. 2 is a plan view of the device showing it attached to the pan.

The attachment comprises a handle or holder, means for detachably securing said holder to any suitable pan, an agitator, and means for revolubly mounting said agitator in said holder.

The holder comprises a horizontal bar 1 which is bent upon itself to form a double handle 2' and whose ends are bent to form bead receiving means spaced apart so as to engage diametrically opposite edges of a pan, such as the pan 14.

The bead receiving means for detachably securing the holder in position upon the pan comprises the bent ends 4, above mentioned, and set screws 3 which pass through apertures in said bent ends 4 and are adapted to engage under the bead of the upper edge of the pan 14 so as to secure the handle to the upper portion of the pan.

The agitator or stirrer comprises a rod consisting of a vertically extending portion 6, crooked portions 7, a horizontally extending portion 8, a hook portion 9 and a handle portion 10 provided with a washer 11 for receiving a knob 12 secured by a washer 13.

The means for revolubly mounting the agitator in the holder comprises an aperture 15 in said holder through which the vertically extending portion 6 of the agitator passes, a bearing bracket 2 secured to the holder by rivets C and D and having a horizontal portion spaced above said bar 1 and a tubular bearing 5 through which the vertically extending rod 6 passes.

In practice the hooked ends 4 of the holder may be slipped under the upper edge of any suitable pan, the set screws screwed into place so as to secure the holder to the pan after which the operator grasping the handle 2' in one hand and the handle 10 of the stirrer in the other may rotate the stirrer to agitate the contents within the pan.

The above described construction provides a very light, strong, and durable attachment which is constructed of relatively light strap metal. The strap metal is bent to form a double handle, and that portion of the holder which crosses the pan and is of a single thickness only, is reinforced by the bearing bracket 2, the same acting as a strut for said portion. These two parts are further reinforced by the tubular bearing 5, the whole forming a rigid structure, whereby the pan and its contents can be held firmly in position and lifted by the extended handle.

The invention thus exemplifies an attachment which may be readily attached to any suitable pan for mixing the contents thereof, such as for mixing frostings and cakes.

The invention is not to be restricted to the details of construction herein set forth, but may be varied so as to be within the scope of the appended claim.

What I claim as my invention is:—

A mixing attachment adapted for removable engagement with an externally beaded pan, comprising a combined handle and pan holder formed of a single bar having one end bent and spaced from said bar to form a bead engaging hook and its opposite end bent downwardly and laterally upon itself for a portion of its length to form an extended double handle, the underlying portion of said handle having its free end bent downwardly to space it from said bar to provide a recess in alinement with said hook to receive the bead of said pan, holding screws mounted in said hook and downwardly bent end, a bearing bracket secured on the top of said bar and longitudinally thereof between said hook and downwardly bent end and having a horizontal portion spaced above said bar, a tubular bearing between said bar and the horizontal portion of said bracket, and an agitator having a vertical portion rotatably mounted in said bar, tubular bearing, and bracket.

RUFUS L. BECK.

Witnesses:
ALBERT J. VINZ,
JOHN A. BOETTCHER.

Copies of this patent may be obtained for five cents each, by addressing the "Commissioner of Patents, Washington, D. C."